May 1, 1951 C. W. DELANEY 2,551,102
LOCK NUT
Filed July 18, 1945
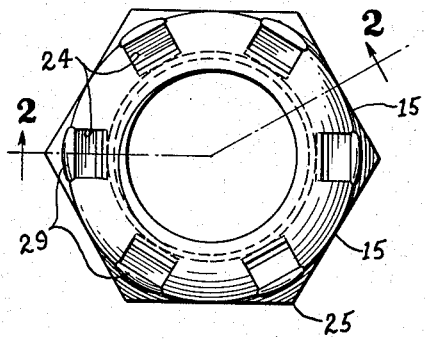
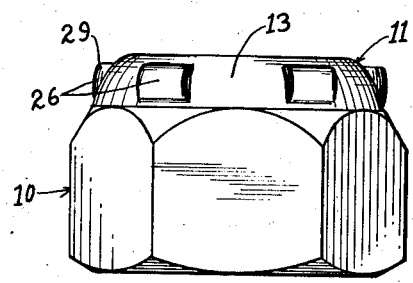
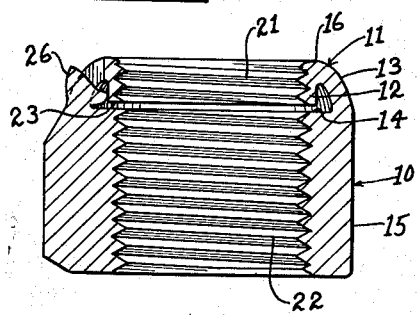
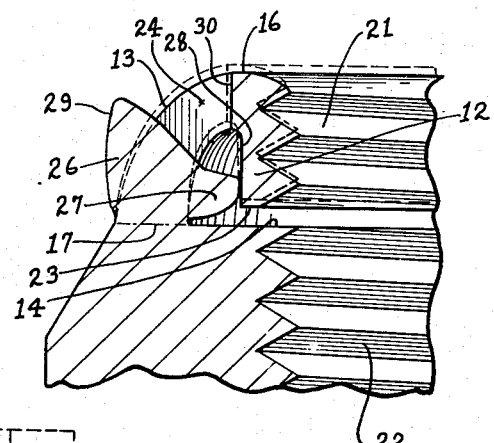
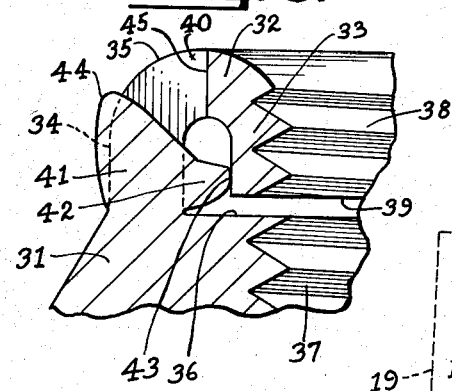
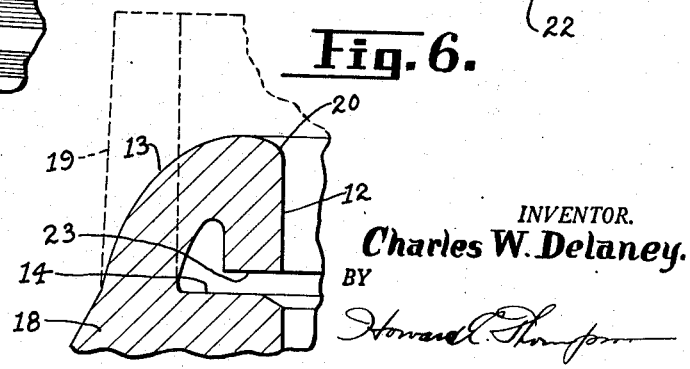
INVENTOR.
Charles W. Delaney.
BY
Howard C. Thompson Patented May 1, 1951

2,551,102

UNITED STATES PATENT OFFICE 2,551,102

LOCK NUT

Charles W. Delaney, Middlebury, Conn., assignor, by mesne assignments, to Boots Aircraft Nut Corporation, Stamford, Conn., a corporation of Delaware Application July 18, 1945, Serial No. 605,713

6 Claims. (Cl. 151—21)

This invention relates to lock nuts or similar thread locking devices of the type employing two threaded sections integrally joined together and movable relative to each other with the common threads thereof set out of phase relative to each other and providing for a one-piece lock nut that will be retained upon a threaded member regardless of the amount of vibration or shock to which it may be subjected. More particularly, the invention is concerned with the lock nuts of the class described wherein the wall portion integrally joining the nut sections is weakened at circumferentially spaced intervals by means of openings or cut-out portions in said joining wall for the purpose of giving said wall the proper amount of resiliency and allow the out of phase threaded portion to give with a degree of ease that will not destroy its own threads or the threads of the member to which it may be attached. Further the forming of these cutout portions is accomplished by removing no stock from the joining wall, but rather the openings are stabbed and sheared, and the stock is formed to a predetermined shape providing for circumferentially spaced backed up and reinforcing members disposed in a position to back up and support the inner threaded out of phase section. Further these cutout portions are arranged in radial alinement with the corner portions of the nut so that any metal stock forced beyond the surface of the supporting wall will lie within the peripheral boundaries of the nut body to facilitate the assembly and removal of a wrench member. The novel features of the invention will be best understood from the following description when taken together with the accompanying drawing, in which certain embodiments of the invention are disclosed, and in which the separate parts are designated by suitable reference characters in each of the views, and in which:

Fig. 1 is a plan view of one form of lock nut which I employ.

Fig. 2 is a section on the broken line 2—2 of Fig. 1.

Fig. 3 is a side view of the nut as seen in Fig. 1.

Fig. 4 is an enlarged sectional detailed view of one portion of a nut, as seen in Fig. 2, indicating diagrammatically the flexed position of the locking section in dotted lines.

Fig. 5 is a view similar to Fig. 4, showing a modified form of construction; and Fig. 6 is a detailed view of the type illustrated in Fig. 4, showing the nut prior to the forming operations illustrated in Fig. 4, and also indicating the contour of the nut blank in dotted lines.

In Figs. 1 to 4 inclusive, and Fig. 6, I have shown one adaptation of my invention, and in these figures I provide a lock nut, which for purposes of description will be defined as comprising a main body or primary nut section 10, at one end of which is disposed a lock or secondary nut section 11. The section 11 comprises an inner tube or sleeve portion 12, the thickness of which is considerably less than the wall thickness of the section 10 and this tube or sleeve integrally joins the section 10 in an outer wall portion 13 which extends from the outer end of the sleeve 12 to the end surface 14 of the section 10. The outer and more or less generated curved surface of the wall 13 extends from the flat surfaces 15 of the section 10 to the outer extremity of the tube or sleeve 12, as seen at 16. It will thus be apparent that the wall 13 is free to flex or yield inwardly and outwardly at a point where said wall joins the surface 14 or substantially at the dot and dash line 17 of Fig. 4 of the drawing.

In forming the lock nut, a nut blank such as partially shown at 18 in Fig. 6 of the drawing is employed, and this blank has extending upwardly from the end surface 14 an annular sleeve or tubular extension, as indicated in dotted lines at 19 in said figure. At this time, it is well to point out that by virtue of the method of forming the section 11 comprising the walls 12 and 13, a relatively short tubular extension 19 is employed and this materially simplifies the manufacture of this nut on heading machines rather than screw machines, and this shorter skirt also allows for the inner end of the wall 12 to be disposed closer to the adjacent nut surface 14 (as in Fig. 6) so as to prevent chips from getting in back of said wall during the tapping operation, such as might interfere with the nut operation. This operation is so performed as to provide a relatively sharp or small radius corner 20 at the upper inner end of the tube or sleeve 12, by controlling the drift of the metal in the forming operation. This is desirable from the standpoint of producing the longest possible threads 21 in the tube or sleeve portion 12, and to extend to the outer extremity of the section 11. The section 10 has threads 22 which are common to the threads 21, the threads 21 being set out of phase in the final completion of the nut, or in other words, in pressing the section 11 inwardly to a slight extent. It will be noted, however, that the inner end 23 of the tube or sleeve 12 is at all times in spaced relation to the end surface 14 of the section 10.

After having completed the operation shown in full lines in Fig. 6 of the drawing, the next step in the formation of the nut is to form a plurality of circumferentially spaced apertures or weakened portion 24 in the wall 13, preferably in alinement with intersecting corner portions 25 of the flat surfaces 15 or at the thickest wall structure of the nut body proper or section 10. The apertures or weakened portions 24 are formed by a stab, shear and form operation, by the use of combination shearing and forming tools which form at the apertures 24 back up reinforcing members 26 substantially of the cross sectional contour seen in Figs. 2 and 4 of the drawing. In other words, in forming these members, part of the wall structure is forced inwardly to form lugs 27 which substantially abut the outer surface 28 of the tube or sleeve 12 and portions 29 which extend outwardly beyond the limits of the angular and curved walls 13 to be disposed within peripheral boundries of the nut, as will clearly appear from a consideration of Figs. 1 and 3 of the drawing.

After the members 26 have been formed, then the threads 21 and 22 are formed in the sections 11 and 10 and in this operation the lugs 27 support the wall 12 to insure the formation of accurate threads therein. In this connection, it will be understood that without the supports or backings 27, the thin wall 12 would be likely to yield in the thread cutting operation, which would result in the formation of improperly cut threads.

In addition to supporting the wall 12 in the formation of the threads, the supporting lugs 27 of the members 26 also operate to aid in guiding the tube or sleeve 12 in its axial movement, and to control to a degree the radial movement of the sleeve in outward flexure of the wall 13, substantially as indicated in dotted lines in Fig. 4 of the drawing. In this connection it will be understood that while the lugs 27 assume a position substantially abutting the tubes or sleeves 12 or the surfaces 28 thereof, slight clearances may prevail, which would permit slight radial movement at the inner end of the tube or sleeve.

By locating the apertures 24 at the thick corner portions 25 of the nut body, the resulting reinforcing and back up members 26 are kept within the boundaries of the primary nut section.

It will also appear from a consideration of Figs. 2 and 4 of the drawing that the outer surface 30 of the tube or sleeve 12 registering with the apertures 24 is beyond the outer surface 28 so as to provide a reinforcement of the tube or sleeve 12 in alinement with the apertures and in order not to weaken the wall structure of the tube or sleeve 12 at these points.

Fig. 5 of the drawing is a view substantially similar to Fig. 4, and showing a modification. In Fig. 5, 31 represents the nut body or primary section and 32 the secondary or locking section comprising a tube or sleeve portion 33 which takes the place of the tube or sleeve 12, and 34 shows the outer wall of the section 32 which joins the tube or sleeve 33 in a semi-circular curved portion 35.

The wall 34 extends integrally from the section 31 or the upper surface 36 thereof and is disposed substantially at right angles to the surface 36. The sections 31 and 32 have common threads 37 and 38, the threads 38 being set out of phase with the threads 37, as with the structure shown in Figs. 1 to 4 inclusive. The inner surface 39 of the tube or sleeve 32 is arranged adjacent but spaced from the surface 36 to allow for flexure of the section 32.

The section 32 is cut out at intervals to form apertures 40, similar to the apertures 24 and in so doing, reinforcing and backing members 41 are formed, which are substantially the same as the backing members 26. In other words, include the inwardly projecting abutments 42 which engage or are arranged in close proximity to the outer surface 43 of the tube or sleeve 33, similar to the abutments or lugs 27. The members 41 or the outer portions 44 thereof also extend beyond the limits of the wall 34, as with the construction shown in Fig. 4, but to a lesser degree, by reason of the difference in contour of the wall 34.

With the construction shown in Fig. 5 of the drawing, the movement of the sleeve or tube 33 is substantially an axial movement. However, any swinging movement that might prevail would be on what might be termed a short radius, or at a point approximately forty-five degrees outwardly of the perpendicular, which is represented by the wall 45, forming one surface of the aperture 40. In other words, this point of fulcrum is brought very close to the upper outer end of the tube or sleeve 33, particularly in comparison to the long radius which is provided in the construction shown in Fig. 4 of the drawing. It will be apparent, however, that the abutments or lugs 42 of the members 41 will aid in supporting and guiding the tube or sleeve 33 in its movement and as with the construction shown in Figs. 1 to 4 inclusive, serve to back the tube in the operation of cutting the threads 38 therein.

With both forms of devices shown, it may be said that the tube or sleeve portions joins the primary nut body or sections in circumferentially spaced yieldable curved wall portions, these wall portions being formed by the apertures or openings in which the back-up and reinforcing members are disposed. It will also appear that these curved wall portions are arranged in alinement with the flat outer surfaces of the primary nut body or sections.

With the construction shown in Figs. 1 to 4 inclusive, the angularity or generated curvature of the outer wall portion 13 or the resulting yieldable wall portions formed by the apertures therein will provide a free axial and radial movement of the sleeve portion 12, thus adapting lock nuts of this type and kind to meet the requirements of what is known as the "Preece test," that is to say the ability of a lock nut to be applied or removed from a bolt or other threaded member a given number of times without removing platings or coatings that may be applied to the bolt or member. In this way, the protection afforded by such platings or coatings can be maintained on the bolt or member. From the foregoing it will be apparent that the ease of action of the sleeve 12 by its supporting yieldable wall portion substantially eliminates the cutting or abrasive action upon the threaded member, while at the same time maintains the desired locking apertures of lock nuts of the kind under consideration.

Having fully described my invention, what I claim as new and desire to secure by Letters Patent is:

1. A lock nut of the class described, said nut comprising two sections, one section comprising a sleeve spaced from one end of the other section, the bore of said sleeve and the other section having common threads, means comprising a curved wall portion extending from the outer end of said sleeve to the other section for integrally joining said sections, and means integral with and spaced circumferentially of the second named section engaging the outer surface of said sleeve for reinforcing and backing said sleeve.

2. A lock nut of the class described, said nut comprising two sections, one section comprising a sleeve spaced from one end of the other section, the bore of said sleeve and the other section having common threads, means comprising a curved wall portion extending from the outer end of said sleeve to the other section for integrally joining said sections, means spaced circumferentially of said wall portion engaging the outer surface of said sleeve for reinforcing and backing said sleeve, said last named means being formed from the material of said wall portion, and said means forming openings in the wall portion giving flexibility to said wall portion.

3. A lock nut of the class described, said nut comprising two sections, one section comprising a sleeve spaced from one end of the other section, the bore of said sleeve and the other section having common threads, means comprising a curved wall portion extending from the outer end of said sleeve to the other section for integrally joining said sections, means spaced circumferentially of said wall portion engaging the outer surface of said sleeve for reinforcing and backing said sleeve, said last named means being formed from the material of said wall portion, said means forming openings in the wall portion giving flexibility to said wall portion, and said wall portion in its entirety being disposed angularly to the axis of said sleeve.

4. A lock nut of the character described comprising a unitary nut body, said body having a primary nut section, a secondary nut section integrally joined with one end of the primary section in a curved wall portion, circumferentially spaced members formed from said wall portion, providing backings for the secondary nut section, and said members forming correspondingly spaced openings in the wall portion giving flexibility thereto.

5. A lock nut of the character described comprising a unitary nut body, said body having a primary nut section, a secondary nut section integrally joined with one end of the primary section in a curved wall portion, circumferentially spaced members formed from said wall portion, providing backings for the secondary nut section, said members forming correspondingly spaced openings in the wall portion giving flexibility thereto, the outer surface of the primary nut section having circumferentially spaced flat surfaces joined by intersecting corner portions, and said members and apertures being located at said intersecting corner portions.

6. A device of the class described comprising two internally threaded tubular sections, one section comprising a relatively short thin walled tube, the other section having a thick wall portion, said thick wall portion having circumferentially spaced flat outer surfaces, circumferentially spaced curved wall portions arranged in alinement with the flat surfaces of said second named sections and extending to the outer end of the first named section for integrally and yieldably joining said sections, said wall portions being widely spaced apart to form openings registering with corner intersections of the flat surfaces of the second named sections, backing members integral with the second named section at said intersections of the second named section and engaging said thin walled tube, said members being arranged within the peripheral boundaries of the second named section, and said curved wall portions having outer surfaces defining a generated curve.

CHARLES W. DELANEY.

REFERENCES CITED

The following references are of record in the file of this patent:

UNITED STATES PATENTS

| Number | Name | Date |
| --- | --- | --- |
| 2,320,785 | Luce | June 1, 1943 |
| 2,381,110 | Chandler | Aug. 7, 1945 |
| 2,393,520 | Crowther | Jan. 22, 1946 |